(12) United States Patent
Hartwell et al.

(10) Patent No.: US 6,701,767 B2
(45) Date of Patent: Mar. 9, 2004

(54) TRAILERED BRAKE WORKSTATION

(76) Inventors: Duane Hartwell, Box 4961, Rte 82, Salt Point, NY (US) 12578; Jonathan Wright, P.O. Box 143, Stanfordville, NY (US) 12581

( * ) Notice: Subject to any disclaimer, the term of this patent is extended or adjusted under 35 U.S.C. 154(b) by 0 days.

(21) Appl. No.: 10/071,793

(22) Filed: Feb. 8, 2002

(65) Prior Publication Data

US 2003/0150251 A1 Aug. 14, 2003

(51) Int. Cl.⁷ .................................................. B21D 5/04
(52) U.S. Cl. ........................... 72/319; 224/401; 108/44
(58) Field of Search ................... 72/319–321; 224/401, 224/403; 108/44

(56) References Cited

U.S. PATENT DOCUMENTS

| | | | | |
|---|---|---|---|---|
| 4,364,254 A | * | 12/1982 | Chubb et al. .................. | 72/319 |
| 4,512,174 A | * | 4/1985 | Rhoades ........................ | 72/319 |
| 4,756,500 A | * | 7/1988 | Baker ....................... | 248/240.3 |
| 4,918,966 A | * | 4/1990 | Raccioppi, Jr. .............. | 72/319 |
| 5,009,545 A | * | 4/1991 | Coleman et al. ............. | 404/100 |
| 5,761,939 A | * | 6/1998 | Spencer et al. .............. | 72/31.1 |
| 5,860,312 A | * | 1/1999 | Anderson ..................... | 72/294 |
| 6,082,164 A | * | 7/2000 | Palmer ......................... | 72/319 |
| 6,435,460 B1 | * | 8/2002 | Van Cleave et al. ........ | 248/164 |

* cited by examiner

*Primary Examiner*—Daniel C. Crane
(74) *Attorney, Agent, or Firm*—Joseph B. Taphorn (57) ABSTRACT

A trailered brake workstation mounts on the horizontal frame of a two-wheeled trailer, a pair of longitudinally-spaced transverse horizontal guide bars at an elevated position above the frame. The guide bars mount slides which are secured to the bottom of a longitudinally-disposed brake. Thus the brake, via the slides, can be shifted laterally on the horizontal guide bars between an internal or centered position it which it may be locked for hauling and storing, and a side position in which it may be locked and available for operative use. A box and a cover protect the brake in the internal or centered position from the elements. A work table may also be transported, being stored in the throat of the brake during transportation, and disposed for use on the other side of the trailer when the brake is operative.

18 Claims, 8 Drawing Sheets

TRAILERED BRAKE WORKSTATION

INTRODUCTION

1. Field the Invention

This invention relates to brakes (machines for bending, flanging, folding, and forming sheet metal0, and more particularly to a trailered brake workstation (a highway vehicle mounting a brake and serving wherever parked as a place of industry).

2. Background of the Invention

Heretofore, brakes have been hauled to a job on the back of a truck, along with a stand on which the brake was carefully mounted after being carefully dismounted from the truck. Brakes are heavy, hence the truck dismounting and stand mounting activity is cumbersome, inconvenient and time consuming. Then the process must be completed in reverse at the end of the day, or the risk of theft entertained.

3. Prior Art

Brakes are well known. Trailers are well known. Not known is a brake-mounting-trailer workstation which can be conveniently drawn to a work site with the brake in a centered position and acted upon to move the brake to an operative position, and with auxiliary materials and equipment including a work table.

SUMMARY OF THE INVENTION

Accordingly, it is an object of the invention to provide a brake-mounting trailer workstation which can conveniently be drawn to a work site with the brake in a stored or hauling position for easy carting.

Another object of the invention is to provide such a trailer worksation, whereon the brake can be easily moved to an operative position on the trailer and held there to constitute a workstation.

Still another object of the invention is to provide such trailer workstations with space to haul and store auxiliary equipment and materials.

Yet another object of the invention is to provide such trailer workstations with a convenient work table too.

An additional object of the invention is too provide that such trailer workstations can be readily reassembled for transport back to the shop at the close of the working day.

A further object of the invention is to provide such trailer workstations that are easy, convenient, and reliable of use, simple of construction, and inexpensive of manufacture.

The objects of the invention are achieved by mounting on the horizontal frame of a two-wheeled trailer, a pair of longitudinally-spaced transverse horizontal guide bars at an elevated position above the frame. The guide bars mount slides which are secured to the bottom of a longitudinally-disposed brake. Thus the brake, via the slides can be shifted laterally on the horizontal guide bars between an internal or centered position it which it may be locked or detented for hauling and storing, and a side position in which it may be locked or detented and available for operative use.

BRIEF DESCRIPTION OF PREFERRED EMBODIMENT OF THE INVENTION

These and other objects, features and advantages of the invention will become apparent from a reading of the following description, when considered with the appended drawings wherein.

DETAILED DESCRIPTION OF PREFERRED INVENTION EMBODIMENT

Figure 1:
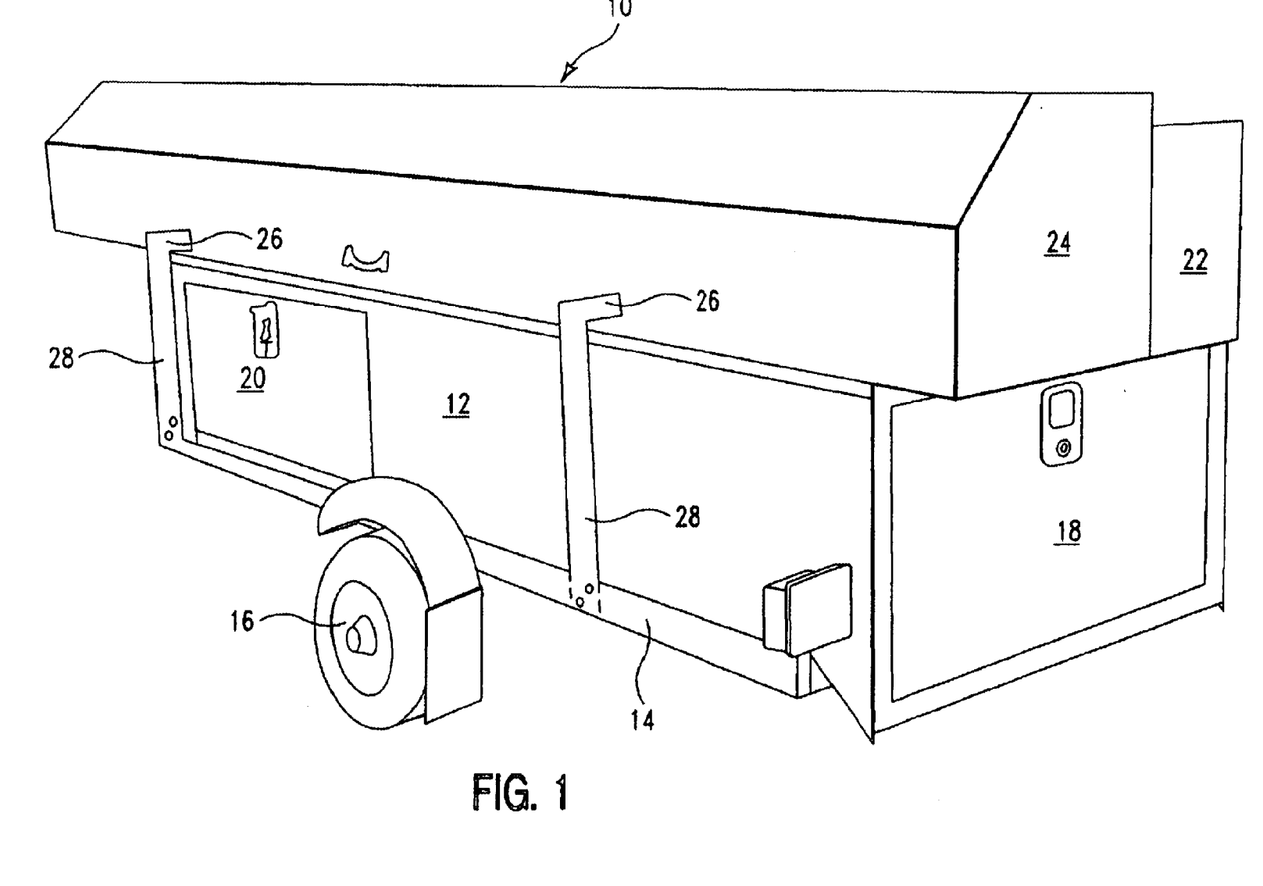
FIG. 1 is a view in perspective (photograph) showing the left and rear side of a trailer workstation constructed according to the invention and closed for brake hauling or storage.
Figure 2:
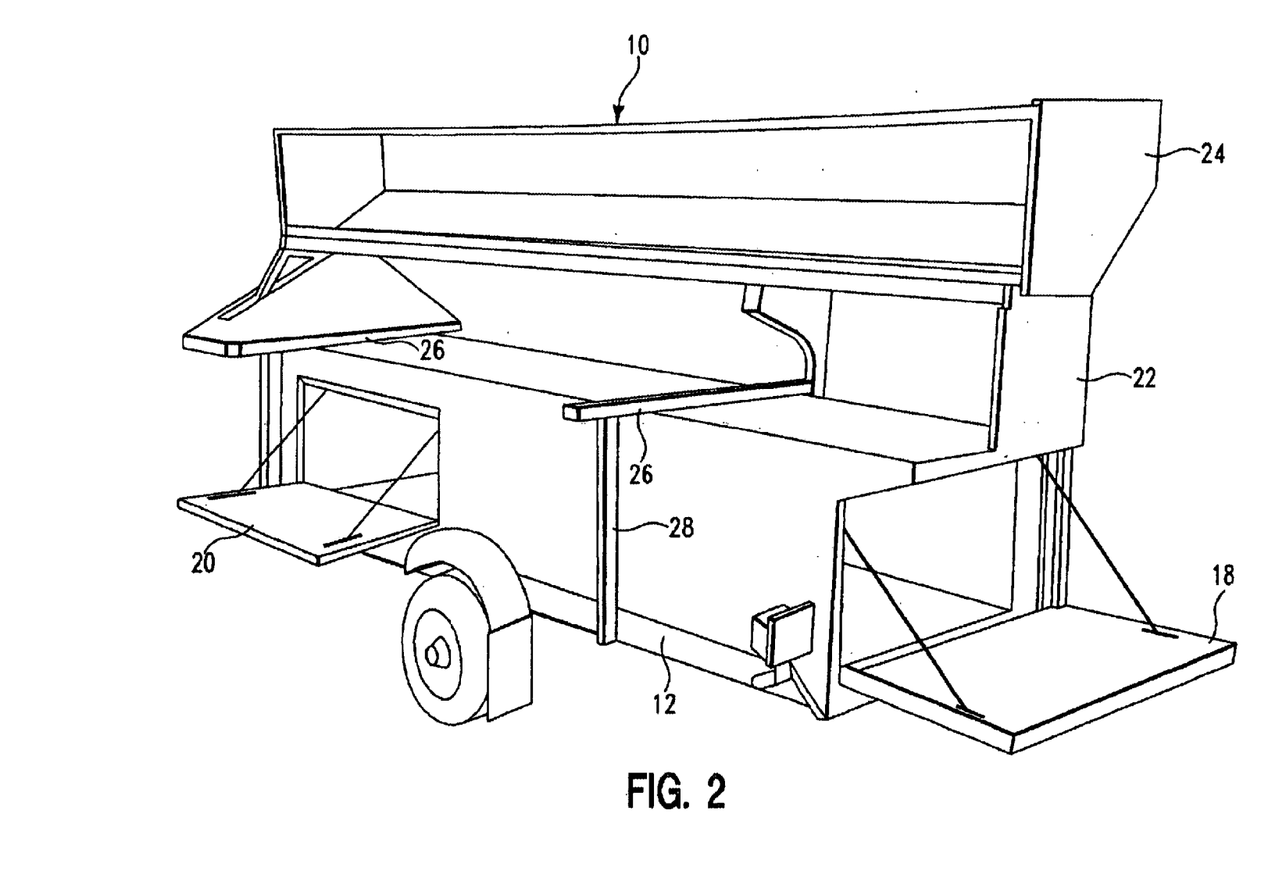
FIG. 2 is a view in perspective (photograph) showing the left and rear side of the trailer workstation with its various compartments opened and the brake removed.

Referring now particularly to the drawings, there is shown in FIG. 1 a brake trailer workstation, generally indicated by the numeral 10, closed for hauling a brake to a site or for storing it. Trailer workstation 10 includes a rectangular box, generally indicated by the numeral 12, mounted on a rectangular frame 14 bearing suitably axled wheels 16. Box 12 includes rear door 18 and left front side door 20, both bottomly hinged and supportedly chained to provide access to the interior of the box for storage purposes. On its upper side, box 12 mounts a box 22 extending longitudinally beyond it ends and open on its left side where it is closed by a brake-shaped cover 24 hingedly mounted at its upper juncture with the box 22 to pivot to an open position where it rests thereon. Horizontal guide bars 26 for accommodating sliding movement of a brake, have their ends rigidly mounted on the upper ends of vertical support posts 28 fixedly secured at their lower ends to the frame 14. The guide bars 26 have rigid interconnections with their support post 28 so that they remain firmly in place when a brake is moved thereon FIG. 2 shows the trailer 10 with it doors 18 and 20 lowered to chain-supported open position, and cover 24 raised by swinging to open position. The space within the box 22 and within the cover 24 can be duly appreciated. The transverse horizontal guide bars 26 are clearly visible.

Figure 3:
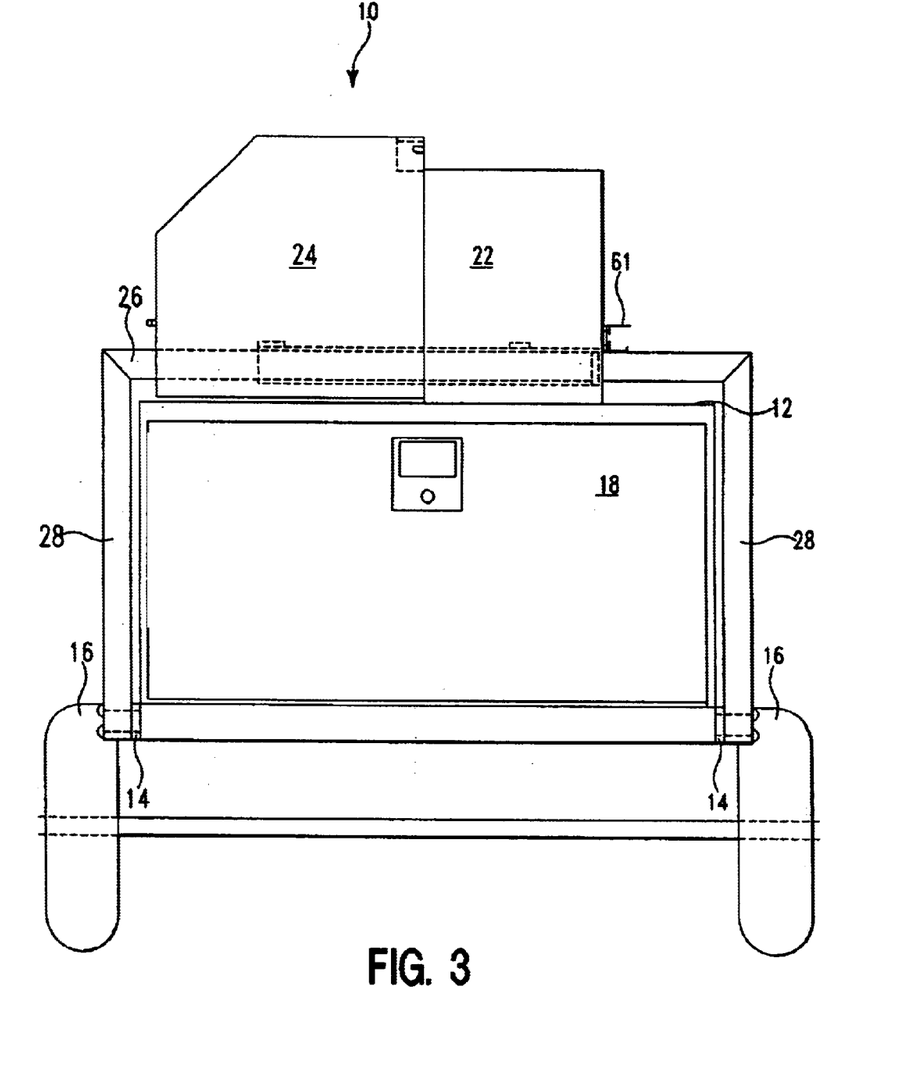
FIG. 3 is an orthogonal diagrammatic view of the rear of the trailer workstation with its compartments closed.
Figure 5:
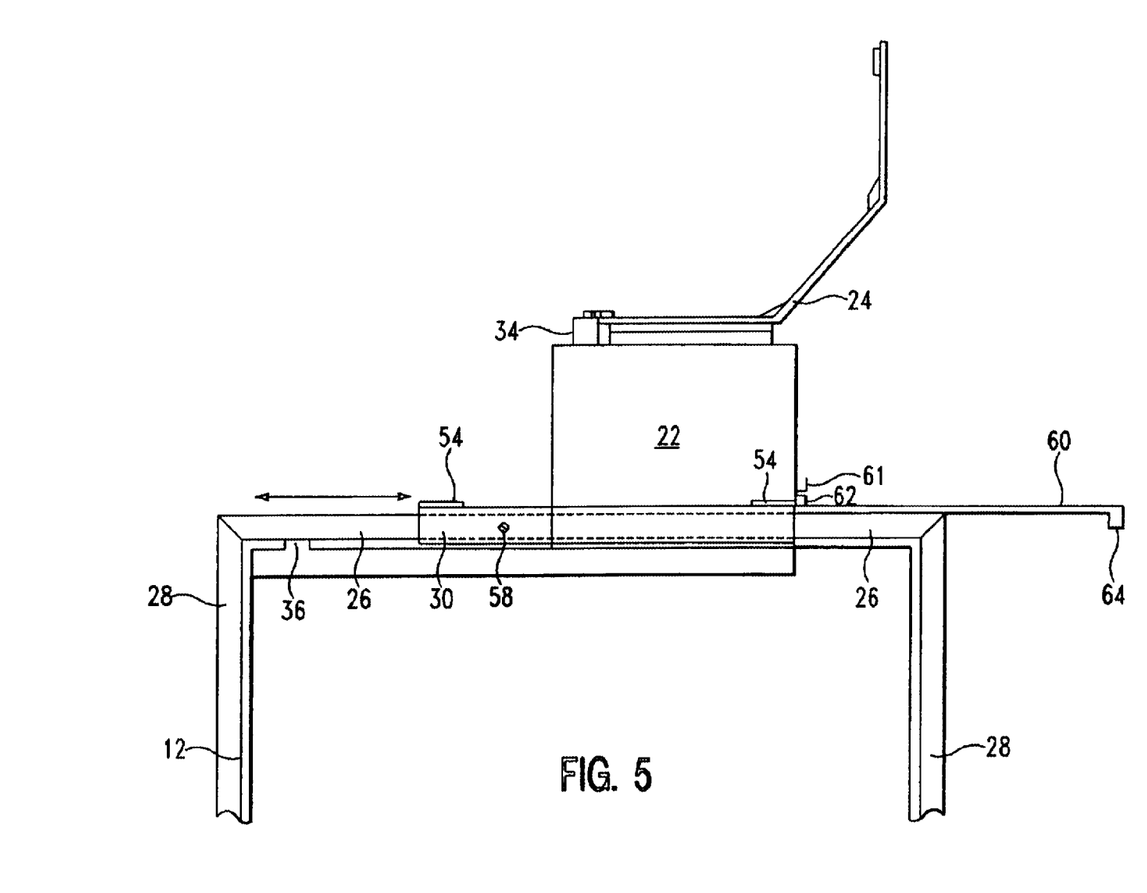
FIG. 5 is a partial orthogonal diagrammatic view of the rear of the trailer workstation, with its top or brake-in-hauling or -stored position compartment opened, and with the brake (invisible) in its inside or stored or hauling position.
Figure 6:
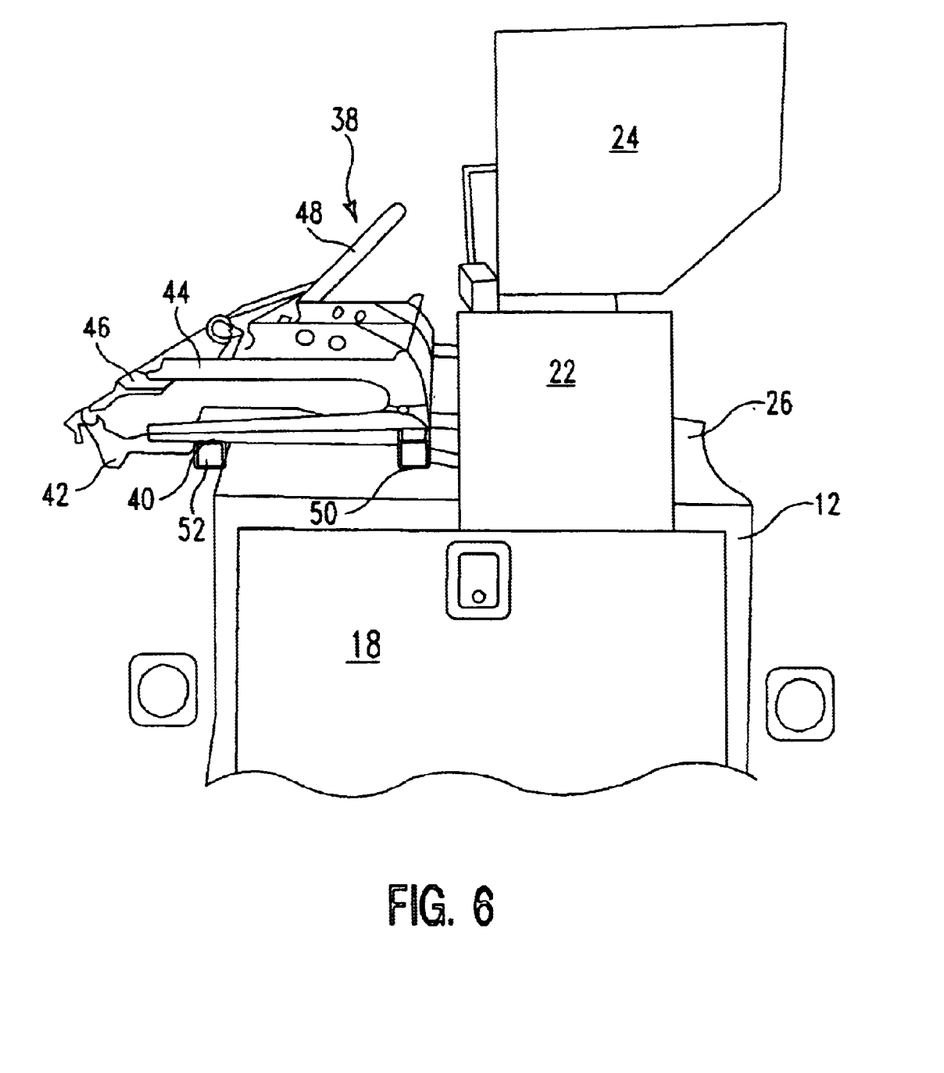
FIG. 6 is a partial view in perspective of the rear of the trailer workstation with its top or brake-in-hauling or -stored position compartment opened, and the brake in operative position.

A precise view of the rear end of the trailer 10 is shown in FIG. 3. Door 18 closes off the opening in the rear end of the box 12 secured on top of the frame 14. Horizontal guide bars 26 frame box 12. Box 22 is shown on top of box 18 to which it is suitably secured. Hinged cover 24 in its closed position rests on the top of box 18, and in its raised position rests on top of the box 22 as shown in FIGS. 5 and 6. The horizontal guide bars 26 extend through both the box 22 and the cover 24 to the vertical support bars 28.

Figure 4:
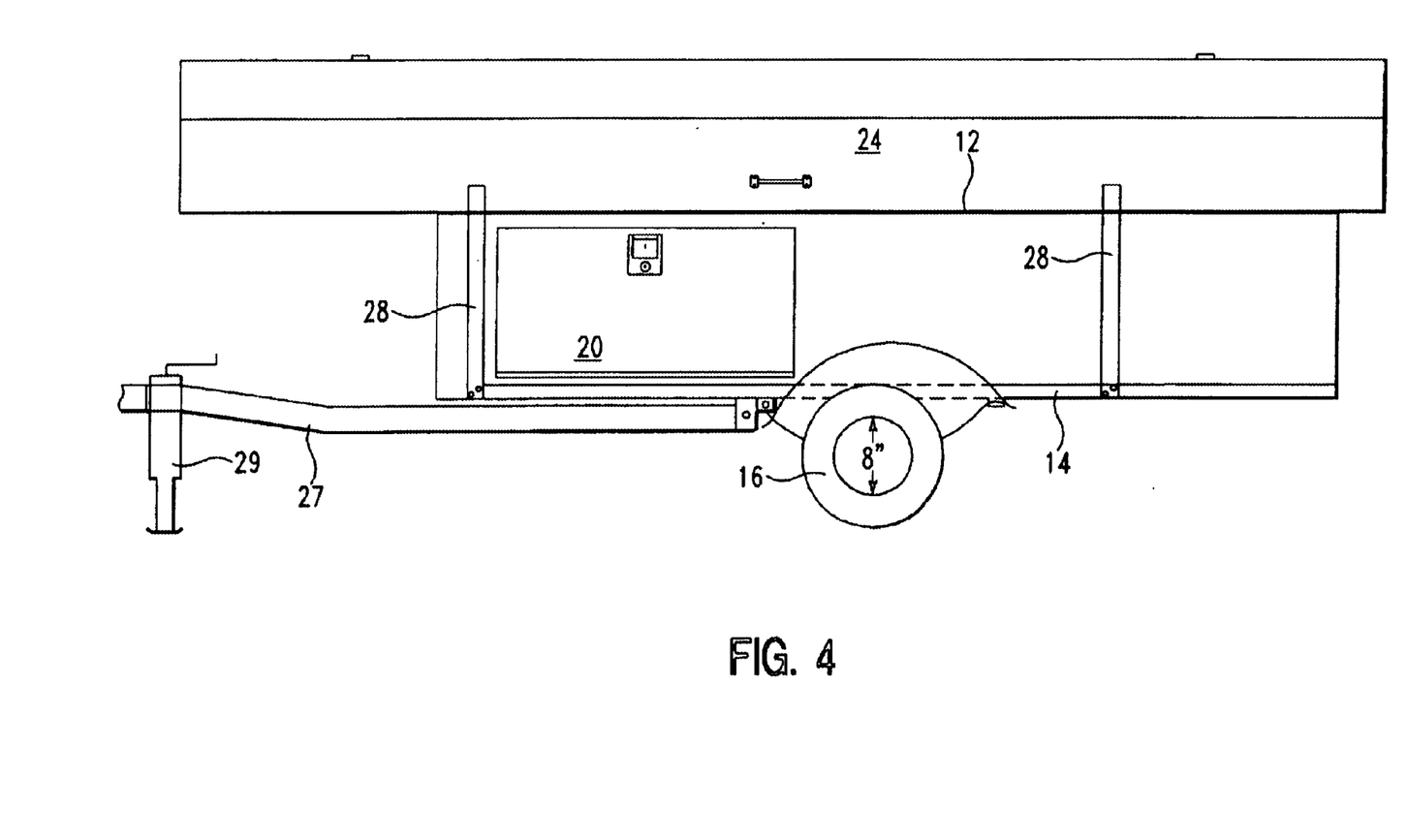
FIG. 4 is an orthogonal view of the left side of the trailer workstation.

A precise view of the left side of the trailer is shown in FIG. 4. Door 20 closes off the opening in the side of the box 12 secured on top of the frame 14. The support bars 28 for the horizontal guide bars 26 have their lower ends bolted to the sides of the frame 14. Hinged cover 24 is shown in its closed position wherein it rests on the top of box 18. A towing frame 27 for connection to a vehicle, is connected at it back end to the trailer frame 14. An adjustable post 29 is mounted on the front end of the towing frame 27 to enable leveling of the trailer at a work site.

Returning to FIG. 5, it also shows a slide 30 for mounting a brake laterally slidable on a horizontal guide bar 26. The slide 30 is shown in its inward position in which if a brake where already mounted thereon, the brake would be centrally mounted on the trailer for maximum haulability, the weight brake being evenly balanced between the two wheels 16. In this central position, most of the weight of the brake would be within the box 22, with the remainder and its overhang under the cover 24 when the later is in its lowered or closed position.

Water curb 34 inside of the hinge for cover 24 on top of box 22 would prevent water from entering the interiors of the box 22 and cover 24 from above. Water curb 36 on top of trailer box 12 prevents water from entering under the closed cover 24. These curbs are particularly important during hauling to prevent salt laden road moisture from wetting the brake.

A brake generally indicated by the numeral 38 is shown mounted on the trailer in FIG. 6. The brake may be any of a number of commercially available ones. Shown in FIG. 6 is Tapco Products Company model PRO-2000 Port-O-Bender. The brake, an elongated apparatus, consists of a fixed lower jaw formed of a series of arms 40 mounting an anvil 42 on their outer ends, and of a upper jaw formed of a series of arms 44 pivoted on their inner ends on the inner ends of the lower-jaw arms 40 and mounting a shaping tool 46 on their free ends to form sheet metal such a aluminum placed in the throat formed between them The upper jaw is biased upward as by a conventional spring. A handle 48 is used to force the upper jaw downwards so that its tool 46 forms the sheet metal upon the anvil 42.

The lower-jaw arms 40 are spaced along and fixed to inner and outer support bars 50 and 52. The brake is mounted on the slides 30 via these bars 50 and 52

As shown in FIGS. 5 and 7–10, the slides 30, which are tubular and slidingly embrace the horizontal bars 26 (FIG. 5), have elongated brake mounting pads 54 rigidly secured to the tops of each of their ends. Suitable holes 56 through the pad elongations allow the insertion of bolts there through to be received in the threaded holes in the bars 50 and 52 such as those heretofore used to mount a truck-dismounted brake on a stand. When the bolts are tightened down the brake is firmly secured to the slides 30.

Figure 7:
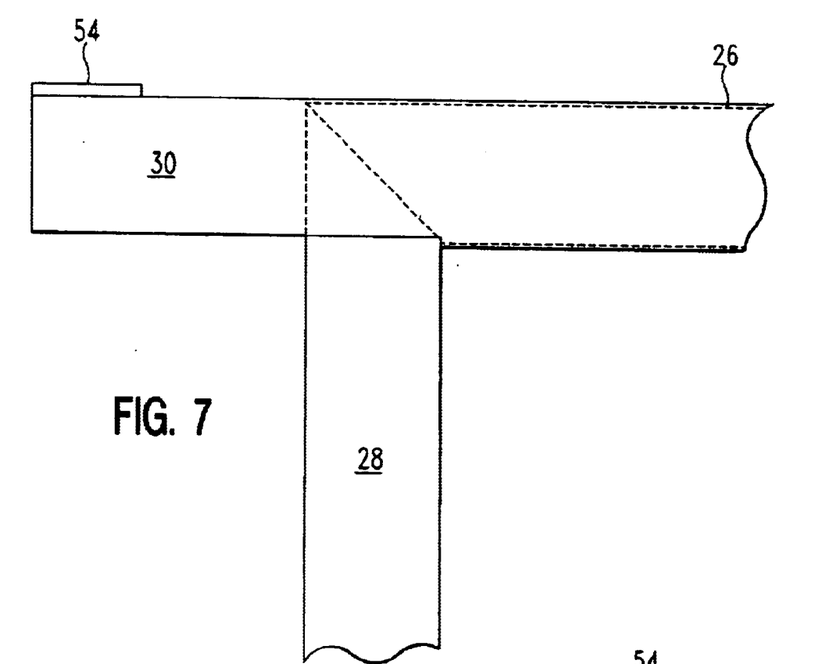
FIG. 7 is an orthogonal upright view of the rear of a brake slide on a horizontal bar and its support.
Figure 8:
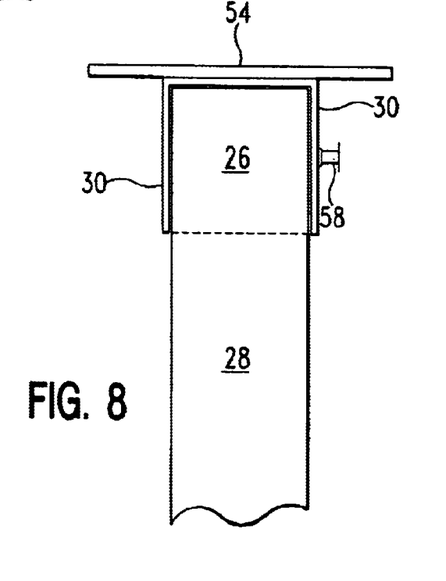
FIG. 8 is an orthogonal upright view of the left hand end of the brake slide of FIG. 7 and of a brake supporting element affixed to it.
Figure 9:
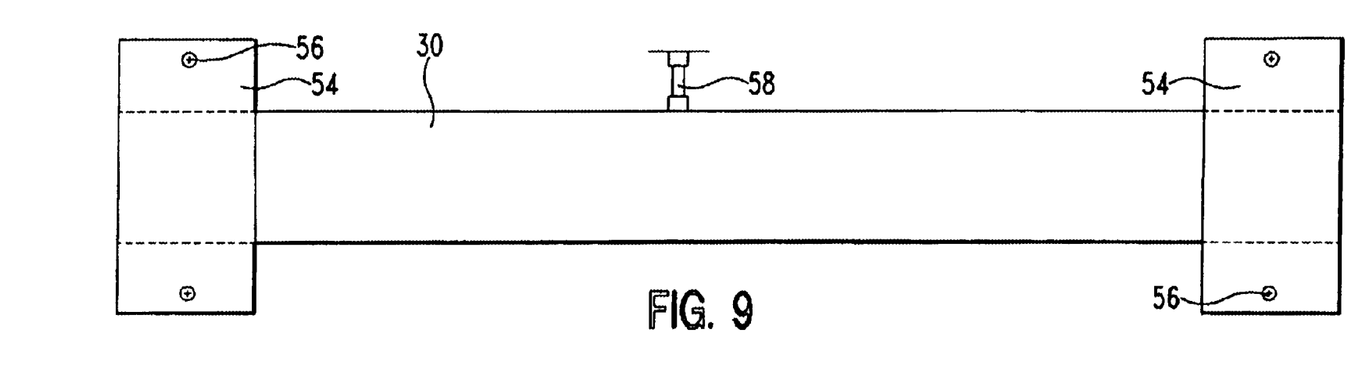
FIG. 9 is an orthogonal top view of a brake slide.
Figure 10:
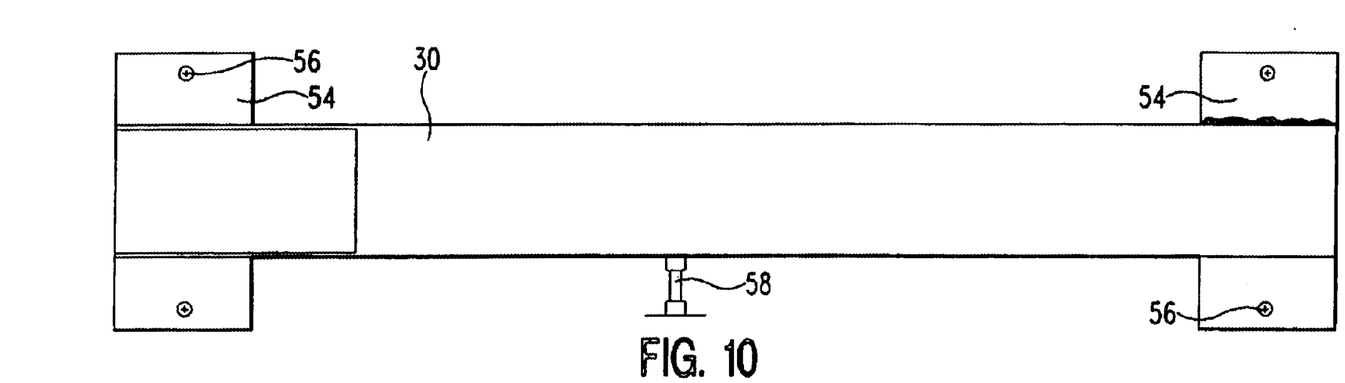
FIG. 10 is an orthogonal bottom view of the brake slide of FIG. 9.

The slides 30 are snugly jet slidingly received on the horizontal bars 26. But a set screw 58 enables the slides, and hence the brake to be locked in the inner or storage or hauling position or in the outer or operative position in which the brake overhangs the left side of the box 12 for convenient use (FIG. 6). In the overhang position, the slides 30 (FIG. 7) extend outwards beyond the support posts 28 for the horizontal guide bars 26. To accommodate this, the slides 30 are cutaway or notched in the bottoms of their outer ends (FIGS. 6, 7, and 10). It results that the ends of the notches, or stated else wise, the presence of the bottom portions of the tubular slides 30, serve to limit the outward excursion of the slides 30 and hence of the brake, a brake positioning mechanism as well as a safety feature.

It has heretofore been known to store flat stock in the throat of a brake. It is also known that it is desirable to have a work table near a brake. Accordingly, a work table 60 (FIG. 5), is temporarily mounted advantageously on the trailer at the work site. The table 60 is mounted on the horizontal bars 26 on the other side of the trailer from the brake, and overhangs them. "C" clips 61 mounted on the right side face of the box 22 receive a square guide 62 also functioning as an anti-deflection bar on the inner edge of the table 60. A similar anti-deflection bar 64 exists on the underside of the outer edge of the table. The complementary location of the two bars 62 and 64 allows the table 60 to be inverted on the horizontal bars 26. Reasons for inversion include freedom to go either way, wear and tear, and different surfaces.

Table 60 is easily removable, and would be stored and transported within the throat of the brake into which it is easily insertable and removable.

It is also know to mount a removable coil holding mechanism (not shown) on the end of a brake and feed the coil directly into the jaws of a brake. One such commercially-available coil holding mechanism is Tapco Products Company SIDE-WINDER Coil Holder System. Such system is conveniently stored in the box 12 via door 18, for hauling to a work site. At the work site, it would be mounted on the nearby end of the brake.

Spare coils of sheet metal may be stored in the box 12 via the front side door 20.

In assemblage, a brake would be mounted on the trailer bolting the pads 54 on the top side of slides 30 locked in their outer position on the horizontal bars 26, to the underside of the support bars 50 and 52 of the brake. Then the set screws 58 would be loosened to allow the slides 30 to move on the horizontal guide bars 26 to the store and hauling position wherein the slides 30 and/or the brake engage the back wall of the upper box 22. Set screws 58 would be tightened to lock the brake in place in the center of the trailer for uniform turning loads in either direction. Cover 24 would then be lowered, to complete, with box 22, the housing of the stored brake.

To use, the trailered brake workstation would be towed to a work site after its tow frame 27 had been hooked to a suitable vehicle and its support post 29 retracted. At the work site, the tow frame 27 would be uncoupled and the support post adjusted to level the trailer (and the brake). The cover 24 would then be lifted, and the set screws 58 loosened. Thereafter the brake would be moved out, via its slides 30, on the horizontal guide bars 26 until the slides 30 engage on their undersides the support posts 28. Set screws 58 would be tightened again to lock the brake in operative position.

The table 60 could be removed from the brake throat at any time and taken around the trailer for placement on the horizontal bars 26 and insertion into the "C" clips 61.

At the end of the day, the brake would be moved to stored position again and the table 60 re-inserted in its throat. The trailered brake workstation could now be hauled back to the shop again.

What is claimed is:

1. A trailored brake workstation, comprising a brake, a vehicle, structure on said vehicle for mounting the brake in a position for hauling to a work site, structure on said vehicle for mounting the brake in an operative position at the work site, and apparatus for conveniently moving the brake between the hauling position and the operative position and involves guide rails mounted on one of the vehicle and the brake for linearly moving the brake between said positions.

2. A trailered brake workstation according to claim 1, wherein the apparatus for conveniently moving the brake involves horizontal guide rails mounted on the vehicle and slides on the rails fixed to the brake.

3. A trailered brake workstation according to claim 2, wherein the vehicle has a frame, and vertical posts affixed to the frame support the horizontal guide rails in elevated position.

4. A trailered brake workstation according to claim 3, wherein the slides on the rails are affixed to the bottom of the brake and tubularly embrace the rails.

5. A trailered brake workstation according to claim 3, wherein the operative position is on one side of the vehicle, and the rails extend to the other side of the vehicle.

6. A trailered brake workstation according to claim 5, and a work table supported on the rails extending to the other side of the vehicle.

7. A trailered brake workstation according to claim 6, wherein the horizontal guide rails have ends and the table extends laterally beyond the ends of the horizontal guide rails, and is held against tipping by structure on the vehicle.

8. A trailered brake workstation according to claim 7, wherein the against-tipping structure includes a C-clip.

9. A trailered brake workstation according to claim 6, wherein the brake has a throat, and the table may be stored in the throat during hauling.

10. A trailered brake workstation according to claim 2, and a housing for protecting the brake against the elements when in hauling position.

11. A trailered brake workstation according to claim 10, wherein the housing is partially formed by a box on the vehicle, and partially by a cover hingedly mounted on the box.

12. A trailered brake workstation according to claim 11, and the cover is shaped to complement that of the brake covered by it.

13. A trailer for hauling a brake to and from a work site and for storing the same, comprising structure on said vehicle for mounting the brake in a position for hauling to a work site and for storing the same, structure on said vehicle for mounting the brake in an operative position, and apparatus for conveniently moving the brake between hauling and operative positions comprising guide rails mounted on one of the trailer and brake for linearly moving the brake between said positions.

14. A trailer for hauling a brake to and from a work site and for storing the same according to claim 13, the apparatus for conveniently moving the brake between hauling and operative positions comprising horizontal guide rails mounted on the trailer and slides on the rails for fixing to a brake.

15. A trailer for hauling a brake to and from a work site and for storing the same according to claim 14, and a box underneath the horizontal guide rails for storing materials and equipment.

16. A trailer for hauling a brake to and from a work site and for storing the same according to claim 15, and a brake storage box above the said materials storage box for partially protecting from the elements any brake that may be fixed to the slides on the guide rails and in hauling position, the horizontal guide rails extending into the brake storage box.

17. A trailer for hauling a brake to and from a work site and for storing the same according to claim 16, and a cover pivoted on the brake storage box for partially protecting from the elements any brake that may be fixed to the slides on the guide rails and in hauling position.

18. A portable brake/table storage assembly, comprising a portable platform, a brake movable on guide rails on said platform between a storage position and an operative position on one side of the platform for linearly moving the brake between said positions and having a throat, and a table movable between a storage position and a use position, the table storage position being in the throat of the brake and the table use position being on the other side of the platform.

* * * * *